United States Patent Office 3,075,749
Patented Jan. 29, 1963

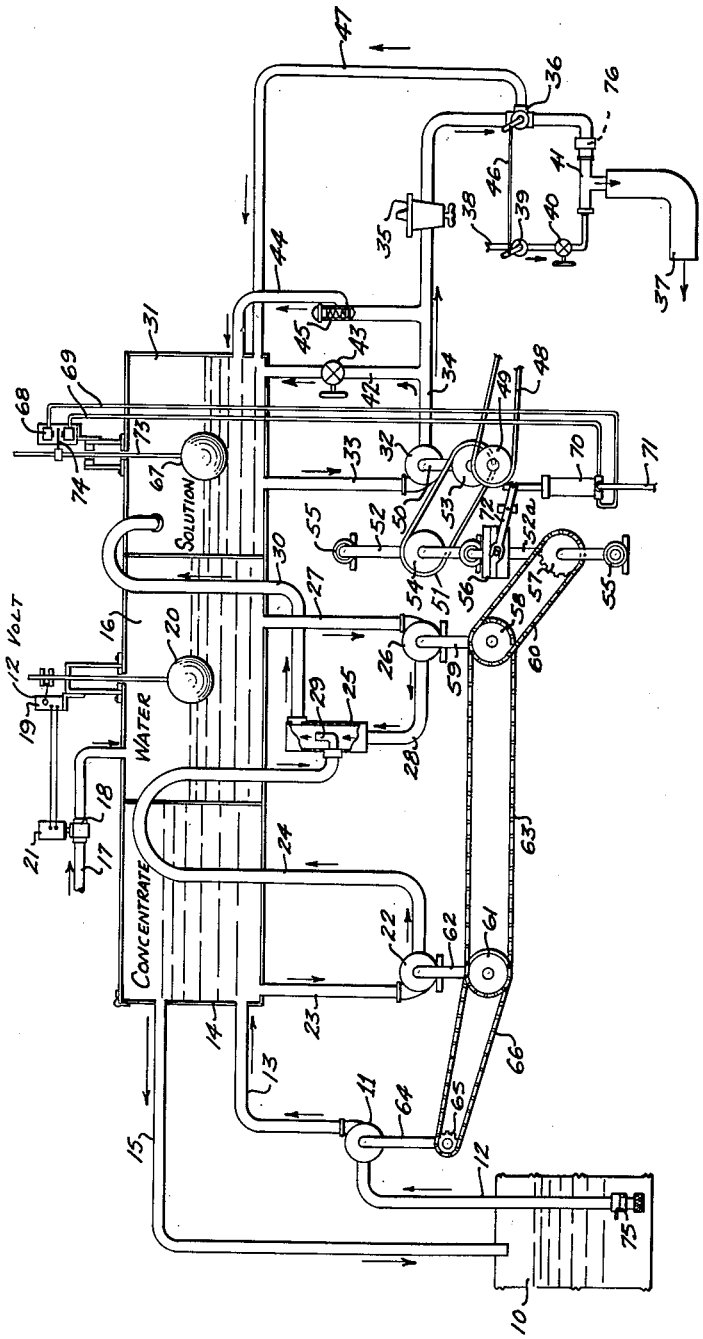

3,075,749
SYSTEM FOR PRODUCING A CONTINUOUS
SUPPLY OF AIR GENERATED FOAM
Walter R. Mason, Jr., Cincinnati, Ohio, and Freddie F. Furnish, Covington, Ky., assignors to Hoge Warren Zimmermann Co., Cincinnati, Ohio, a corporation of Ohio
Filed May 25, 1960, Ser. No. 31,712
18 Claims. (Cl. 261—75)

This invention resides in an arrangement of apparatus which will produce a continuous supply of air generating foam, such as is needed in connection with certain lightweight concrete work, and which is immediately responsive to the actions of an operator.

A continuous supply of pressure generated foam is needed in connection with certain lightweight concrete work in buildings, roof decks, fills, floors and the like. To be commercially satisfactory it is necessary that the production of this foam be automatic in action and yet responsive to the control of an operator.

In concrete work of the type hereinbefore mentioned a prefabricated air foam is mixed with concrete material in order to give it certain light density and high insulation characteristics. This foam is commonly formed by mixing a hydrolyzed protein foam liquid concentrate with water, the percentage usually being in the range of 2–5% of the concentrate. To produce the actual foam this solution is then blended with a stream of compressed air in a suitably baffled tube. The foam concentrate is commercially available in 55-gallon drums. In the past the foam concentrate has been diluted in batches, for example, 8 gallons of concentrate have been dipped out and added to 192 gallons of water, thereby filling a 200-gallon storage tank. The foam solution would then be forced out of the storage tank by air pressure. The solution would eventually be forced through an orifice at which point the solution would encounter compressed air. The meeting of the compressed air and foam solution generated the foam itself. This foam was discharged from a so-called "foam gun." The flow of foam from the foam gun could be arrested by simultaneously closing valves in the air and liquid solution lines. When the storage tank became empty the process was necessarily halted until a new charge was made, unless a second storage tank was available and suitable switchover connections were used.

The tank-batch system of preparing foam, that is, the system just above briefly described, has proved in practice to be a rather messy operation having certain undesirable features. The tanks would become dirty and coated with gummy residue. Grit and gum would frequently get into and restrict the various lines, thus affecting the quality of the foam which is quite sensitive to variations in pressure and in orifice area. Labor requirements were high. The apparatus required was large and inconvenient to handle, an expensive proposition since it had to be transported from one construction job to another, usually at frequent intervals.

In the past the mixes obtained by the old tank-batch system of preparing foam were often not homogeneous with the result that the foam generated was variable in quality and, perhaps even more important, the volumetric yield in foam from a given amount of foam concentrate was not always what it should have been. This probably was because the concentrate was not stirred sufficiently and the solution was not well mixed. The foam concentrate is relatively very expensive and, therefore, it is very important to get a full yield of foam from it. Also, variations in the quality of the foam directly affect the quality of the resulting concrete material which includes the foam as a part thereof, and variations often occurred in quality since so much depended on the accuracy of the worker in preparing the batches of solution.

A very important object of the invention, therefore, is to provide a system which will replace the heretofore used tank-batch system and which new system will be free of the defects above outlined.

An important object of the invention is to provide a unit that may be intermittently or continuously operable to produce a constant quality foam. This will enable the foam to be used with concrete which is produced in batches and also with concrete which is produced in a continuous fashion.

Another important object of the invention is to provide a system in which the foam concentrate may be metered and in which the water may also be metered, both with precision and at the desired ratio, and for as long or short a time as the operator desires. The necessary metering may be accomplished automatically.

Another object of the invention is to provide a system for producing foam, which system requires much less labor than any system for producing foam heretofore known. The concentrate may be drawn into the unit automatically thereby eliminating the need for a worker to load in the concentrate manually.

It is also an object of the invention to provide a system in which the water may be introduced automatically into the system and metered in the quantity desired to form the foam solution.

Another very important object of the invention is to provide an arrangement which insures that the foam concentrate and water are thoroughly mixed to provide a completely homogeneous foam solution.

Another important object of the invention is to provide a system in which the foam solution is delivered to the foam gun under a constant, predetermined pressure in such manner that when the gun is turned off and then turned on again the solution is instantly available under the correct pressure at the moment of the reopening of the valve at the foam gun.

A very important object of the invention is to provide an arrangement in which the delivery of foam solution to the foam gun is substantially independent of the rotational speed of the drive means which powers the principal operating parts of the foam unit. Thus the mechanism is to function perfectly in spite of variations in the speed of the drive shaft, within operable limits.

Other objects of the invention are to prevent contamination of the unit, to keep the concentrate itself homogeneous, to protect certain parts of the system from the high pressures which are necessary in it, to produce a maximum yield of foam from a given quantity of concentrate, to form a foam of the highest quality and to produce a small, compact unit which is easy to use and economical to manufacture.

These and other objects of the invention will become apparent to those skilled in the art from the description to follow, from the remarks above and with reference to the accompanying drawing consisting of a single FIGURE, and in which drawing like numerals are employed to designate like parts throughout.

The single figure of the accompanying drawing is schematic in nature with certain parts shown diagrammatically and certain parts broken away.

Although in the description to follow the apparatus is described as operating with foam liquid concentrate and water, it will be apparent to those skilled in the art that the system may be adapted for the handling of other materials and, therefore, the invention is not to be limited to the particular system and particular ingredients except insofar as these are specifically set forth in the subjoined claims.

Referring now to this drawing, a drum containing foam liquid concentrate is indicated at 10. A pump 11 pumps concentrate from the drum 10 through the pipes or other suitable conduits 12 and 13 to the container 14. An overflow pipe extends from the top portion of the container 14 to the drum 10. The pump 11 is designed to pump more concentrate from the drum 10 to the tank 14 than is pumped from the tank 14 in the manner to be described shortly. This produces a stirring of the concentrate within the drum 10. This constant stirring of the concentrate within the drum 10 keeps the concentrate homogeneous and contributes materially to the high quality of the foam which is produced by this novel system.

Water is stored in a second container or tank 16. The water conduit 17 may be attached to any convenient supply of water, not shown, but normally supplied to the machine by a pressure line. A valve 18 in the pipe 17 is controlled through a float-actuated switch 19. The float is generally indicated at 20 and the solenoid at 21. It will be apparent to those skilled in the art that as the water reaches a certain level in the tank or container 16, the switch 19 will actuate the solenoid 21 whereby to open the valve 18 and permit more water to enter the tank through the conduit 17. When the level in the tank reaches a desired maximum, this same arrangement will close the valve 18. In this manner, which is old and well known in the art, the level of water in the container 16 is kept substantially constant between desired limits.

A pump 22 draws concentrate from the container 14 through a conduit 23 and pumps this concentrate through a conduit 24 to the mixing chamber 25. The pump 11 delivers an excess of concentrate to the tank 14, that is, the pump 22 draws less material from the tank 14 than the pump 11 puts into it. This relationship between the pumps 11 and 22 accomplishes two important functions. One, it provides, through the overflow arrangement 15, for the constant stirring of the concentrate within the drum 10 as previously explained. Two, it keeps a substantially constant head of concentrate within the tank 14 and on the pump 22. By maintaining a constant head on the pump 22, which is positive displacement rotary pump, this pump may be used as a metering device.

A pump 26 draws water from the tank 16 through the conduit 27 and pumps it through the conduit 28 to the mixing chamber 25. The concentrate and water come together in this chamber 25 and a solution having the desired percentage concentrate in water is there produced. The relationship between the pumps 22 and 26 is such that, when a 4% solution is desired, the throughput of water is 24 times that of the concentrate. Good mixing of the water and concentrate is obtained by introducing the concentrate towards the center of the chamber 25 as indicated by the nozzle or spout 29 located centrally of this chamber.

The solution resulting from the mixture of concentrate and water, these ingredients being pumped by the pumps 22 and 26 respectively, passes through a conduit 30 to a container or reservoir 31. A pump 32 draws solution from the tank 31 through the conduit 33 and forces it through the conduit 34. A pressure regulator 35 is located in the conduit 34. In the preferred arrangement of this invention the pressure regulator is set at 80–90 pounds per square inch. Also located in the conduit 34 is a three-way valve 36. In its normal position the valve 36 permits solution to pass through the conduit 34, and through the orifice 76, and thence to the discharge means 37, which means is commonly called a "foam gun."

The conduit 38 is connected to a suitable supply of air under pressure, not shown. A shutoff valve 39 is located in this conduit 38 and an air metering valve 40 is also provided in this air line 38. Compressed air and solution come together at the juncture 41 and foam is generated as they pass through the gun 37. The generated foam is discharged from the end of this gun. This foam may then be used as desired in the concrete material or in other ways. In the present set-up it is contemplated that this foam will be mixed with concrete for producing building material of a particular type. The handling of the foam itself, that is, the further blending of the foam with other ingredients, such as concrete, does not constitute a part of this invention.

The tank 31 is also connected to the conduit 34 by another conduit 42. A hand valve 43 is located in in the conduit 42. Normally the valve 43 is closed, but it may be opened to take all pressure off the pump 32. Also connecting the tank 31 and conduit 34 is yet another conduit 44. A spring actuated pressure bypass valve 45 is provided in the conduit 44. In the preferred arrangement of this invention the valve 45 will be set at about 100–120 pounds per square inch.

The quantity of foam solution delivered through the orifice 76 depends on the size of this orifice and on the pressure drop across the orifice which is a function of the delivery pressure of the foam solution. The delivery pressure is maintained constant by means of the bypass valve 45 and the pressure regulator 35. Thus, during correct operation, the size of the orifice opening 76 alone determines the throughput of foam solution.

As previously indicated the valve 45 will be set at about 100–120 pounds per square inch. This pressure will be reduced to 80–90 pounds per square inch by the pressure regulator 35. When the unit is operating a certain portion of the foam solution is constantly bypassing through the valve 45 and conduit 44. As a consequence of this the tank 31 contains foam solution which is constantly being stirred and agitated, thus making for good homogeneity. This constant recirculation not only stirs the foam solution and keeps it homogeneous but it also prevents settling even when the gun proper 37 is not running.

Preferably the three-way valve 36 and shut-off valve 39 are connected so that they are actuated simultaneously. When it is desired to close the gun 37, the supply of compressed air is shut off by closing the valve 39. The connection between this valve and the three-way valve 36 is indicated at 46. When the valve 36 is moved from its position wherein it admits solution to the gun 37, it then directs the solution through the conduit 47 which returns to the tank 31. This permits the solution to be recirculated until such time as one wishes again to actuate the gun 37 so as to produce more of the foam. In the recirculating position of the valve 36, the pressure on the discharge side of the pump 32 falls from 100–120 pounds per square inch to about 40 pounds per square inch, because the solution no longer is being forced through the constricted orifice 76. (This orifice 76 is about ⅛" in diameter as compared with the conduit 47 which is about ½" in diameter.)

By returning the shut-off valve 39 to its open position and actuating the three-way valve 36 so that air and solution again come together at 41, foam is again produced immediately. Were it not for the provision of the return conduit 47, recirculation would have to take place through the conduit 44, and this puts an undue strain on the bypass valve 45 as well as on the pump 32.

The pumps 11, 22, 26 and 32 are actuated as follows. The belt 48 is connected to a suitable power source, not shown, which may be a gasoline motor or the power take-off from a truck. This will drive the pulley 49 which is fixed on the actuating shaft 50 of the pump 32. Another belt 51 connects the shaft 50 to a shaft 52 through the pulleys 53 and 54 respectively. The shaft 52 is located in suitable bearings 55. A friction clutch 56 is provided by which the shaft portion 52a may be separated from driving contact with the shaft portion 52. The friction clutch 56, in its normal position, drivingly connects the shaft portions 52 and 52a.

Mounted on the shaft portion 52a is a sprocket 57. Another sprocket 58 is mounted on the shaft 59 which is the actuating shaft for the pump 26. A chain 60 connects these two sprockets.

Another sprocket 61 is mounted on the actuating shaft 62 for the pump 22. A chain 63 connects the shafts 59 and 62.

Fixed on the actuating shaft 64 of the pump 11 is a sprocket 65, the shafts 62 and 64 thus being connected by the chain 66.

From the foregoing, assuming that the friction clutch 56 is engaged, it will be apparent that all the pumps 11, 22, 26 and 32 are simultaneously actuated from a single power source via the belt 48 and the various successive connections between the shafts 50, 52, 59, 62 and 64. When the friction clutch 56 is disengaged, however, only the pressure pump 32 will continue to operate since actuation of the pumps 11, 22 and 26 depends upon rotation of the shaft portion 52a.

It is to be understood that the input speed of the belt 48 does not have to be constant in order to insure proper functioning of the system of this invention. This speed must be above a certain minimum to insure that the pump 32 will build up a discharge pressure as pointed out, but the speed of the belt 48 may vary within a considerable latitude above this minimum without affecting the normal function of the invention. This is important because in the common use of the invention the belt 48 is actuated by the motor of a truck, and this motor is usually driving other mechanism, which requires changes in the r.p.m. developed by the motor, within certain limits.

Referring again to the tank 31, it will be observed that this tank has been provided with a float 67. A pair of air line buttons 68 is provided. These buttons are located in a pair of lines 69 leading to the air cylinder 70. A line 71 connects this part of the system to a suitable air supply, not shown, but this may be the same source which supplies air to the foam gun, as previously described. Thus the lines 38 and 71 may be connected to the same air compressor. The actuating lever 72, for disengaging the friction clutch 56, is connected to the air cylinder 70. The float 67 has a stem 73 which carries a member 74 located so as to engage either of the air buttons 68, depending on the level of solution within the tank 31.

The arrangement of the parts 67—74 is such that when the level of solution in the tank 31 reaches a predetermined maximum, the member 74 will engage the upper button 68 whereby to actuate the air cylinder 70. Actuation of this air cylinder will, through the member 72, disengage the friction clutch 56 so that the shaft portion 52a will no longer be rotated. This will stop the pumps 11, 22 and 26 so that concentrate is no longer drawn from the drum 10 and so that the concentrate and water are no longer pumped through the mixing chamber 25 and then to the tank 31. The pump 32, however, remains in operation so that solution may still be drawn from the tank 31 and moved through the orifice 76 to the gun 37. (Preferably the orifice 76 is located in an orifice plate positioned within an openable coupling so that changes in the size of this orifice may be made through a wide range, and with ease, as desired.) When the level of solution in the tank 31 reaches a predetermined minimum, the member 74 will engage the lower button 68 and the air cylinder will be moved to its normal position as illustrated in the drawing. In this normal position of the air cylinder 70 the friction clutch 56 remains engaged whereby rotation of the shaft 52 also results in rotation of the shaft portion 52a and the actuating shafts 59, 62 and 64 for the pumps 26, 22 and 11 respectively. In this normal condition concentrate is drawn from the drum 10, collected in the tank 14 and pumped to the mixing chamber 25, while water is pumped from the tank 16 to this same mixing chamber, whereby solution is formed and forced through the conduit 30 to the tank 31.

It should be noted that delivery of the foam solution by the two pumps 22 and 26 is in excess of the amount being consumed through the orifice 76. The level of the tank 31, therefore, will inevitably build up until the button 68 is tripped and the clutch which actuates the metering pump 22 and 26 is disengaged. The pumps 22 and 26 are geared to put through more fluid than it is ever desired to consume through the largest orifice 76.

In order to start the system the pipes 12 and 15 are connected to the drum 10 as shown. Preferably the pipe 12 is provided with a lift swing valve 75 to prevent backflow of the concentrate through the pipes 12 and 13 and pump 11. The water is turned on at the source. The motor or power takeoff, to which the belt 48 is connected, is rotated above a certain minimum speed. Fluctuation above this minimum speed is permissible. Preferably the hand valve 43 is closed. Initially the gun 37 is turned off, that is, the air valve 39 is closed and the three-way valve 36 is positioned to recirculate solution through the conduit 47. The floats 20 and 27 will be in their lower positions whereby the valve 18 is open and the friction clutch 56 engages the shafts 52 and 52a. All of the pumps 11, 22, 26 and 32 will be in operation. The pump 11 will be filling the tank 14 with concentrate from the drum 10. The pump 22 will be pumping concentrate from the tank 14 to the mixing chamber 25. The pump 26 will be pumping water from the tank 16 to the chamber 25. Continuous operation of the pumps 22 and 26 forces the mixture of concentrate and water through the conduit 30 to the tank 31. The pump 32 will be recirculating the solution in the tank via the conduits 33, 34 and 47. The pressure relief valve 45, which is set at a higher pressure than the pressure regulator 35, will thus not be passing foam solution.

The system being in operation as just described, the operator may obtain foam therefrom simply by turning on the gun 37, which means opening the shutoff valve 39 in the air line 38 and moving the three-way valve 36 so as to divert the solution from the conduit 47 to and through the orifice 76; at the same time valve 45 opens to divert a portion of the solution back to the tank 31 through the conduit 44. The pressure at the orifice 76 immediately becomes 80 to 90 pounds per square inch. Actuation of the valve 39 and 36, to "turn on" the gun, may be accomplished simultaneously as generally indicated at 46. When solution accumulates to the maximum in the tank 31, the float arrangement 67—74 will result in disengaging the friction clutch 56 so as to stop the pumps 11, 22 and 26 while permitting the pump 32 to continue. When the quantity of solution in the tank 31 is reduced, the parts 67—74 will return the friction clutch 56 to its normal position, which is that illustrated in the figure, whereby the shafts 52 and 52a are drivingly connected, the pumps 11, 22 and 26 thus being returned to action. The water level in the tank 16 will be regulated by the float arrangement 20 and, excess concentrate which accumulates in the tank 14 will go back to the drum 10 through the overflow conduit 15, thus providing the recirculation of the concentrate earlier described, which recirculation keeps the concentrate in the drum homogeneous.

Assuming the conduits 12 and 15 to be in position within the drum 10, the pipe 17 to be connected to the water source, and the belt 48 to be connected to a power source in operation, the "on" position of the gun 37 is that when the shut-off valve 39 is open and the three-way valve 36 directs solution to the member 41 and gun proper 37. The "off" position of the gun 37 is that when the shut-off valve 39 is closed and the three-way valve 36 recirculates the solution to the container 31 via the conduit 47. The operator can check the quality of the foam initially produced by eye, upon the gun being turned on. Only a very small quantity of this foam initially produced may be of inferior quality due to lack of homogeneity. Immediately thereafter, however, a continuous supply of foam of constant quality is available to the operator as desired, simply by turning the gun 37 "on" or "off."

It is believed that the invention and its operation have been clearly set forth in the foregoing passages. It is to be understood, however, that although the invention has been illustrated as embodied in particular arrangements and structures, these arrangements and structures are not to constitute a limitation except insofar as they are specifically set forth in the subjoined claims. It will be apparent to those skilled in the art that modifications may be made in these arrangements and structures without departing from the scope and spirit of the invention.

Having thus described the invention, what is claimed as new and what is desired to be protected by United States Letters Patent is:

1. In a system for producing a continuous supply of foam of constant quality, a first conduit connected to a source of foam liquid concentrate and to a concentrate tank, a second conduit connected to a source of water and to a water tank, a mixing chamber connected to the concentrate tank and to the water tank, a first positive displacement pump to pump concentrate from the source to the concentrate tank, a second pump to pump concentrate from the concentrate tank to said mixing chamber, said first pump having a greater capacity than said second pump, a third pump to pump water from said water tank to said mixing chamber, the through-put of said third pump being greater than that of said second pump, a solution tank connected to said mixing chamber, said second and third pumps pumping solution from said mixing chamber to said solution tank, a foam discharge gun, an air line from a source of compressed air to said gun, a third conduit from said solution tank to said gun, a fourth pressure pump to pump solution from said solution tank through said third conduit to said gun, and means at said gun for mixing said solution and said air to make said foam, said last mentioned means including an orifice through which said solution passes into contact with the air and means to maintain a constant pressure of solution against said orifice.

2. The system of claim 1 including an overflow conduit from said concentrate tank to the concentrate source.

3. The system of claim 1 including means to control the level of water in said water tank.

4. The system of claim 1 including a shut-off valve in said air line and a valve in said conduit whereby to stop the supply of air and solution to said gun.

5. The system of claim 4 including means connecting said shut-off valve and the valve in said third conduit, whereby these two valves are actuated simultaneously.

6. The system of claim 4 including a recirculation conduit from said third conduit to said solution tank, the valve in said third conduit having a connection to said recirculation conduit, whereby when the said valve in said third conduit is actuated to stop the supply of solution to said gun, said solution is directed by the said valve in said third conduit into said recirculation conduit.

7. The system of claim 1 including common means to actuate all of said four pumps simultaneously.

8. The system of claim 7 including means to deactuate the first three of said pumps while permitting said fourth pump to continue to operate.

9. The system of claim 8 including control means for said last mentioned means, said control means being actuated by the level of solution in said solution tank.

10. In a system for producing a continuous supply of foam of constant quality, a first conduit connected to a source of foam liquid concentrate and to a concentrate tank, a second conduit connected to a source of water and to a water tank, a mixing chamber connected to the concentrate tank and to the water tank, a first positive displacement pump to pump concentrate from the source to the concentrate tank, a second pump to pump concentrate from the concentrate tank to said mixing chamber, said first pump having a greater capacity than said second pump, a third pump to pump water from said water tank to said mixing chamber, the through-put of said third pump being greater than that of said second pump, a solution tank connected to said mixing chamber, said second and third pumps pumping solution from said mixing chamber to said solution tank, a foam discharge gun, an air line from a source of compressed air to said gun, a third conduit from said solution tank to said gun, a fourth pressure pump to pump solution from said solution tank through said third conduit to said gun, means at said gun for mixing said solution and said air to make said foam, said last mentioned means including an orifice through which said solution passes into contact with the air and means to maintain a constant pressure of solution against said orifice, an overflow conduit from said concentrate tank to the concentrate source, means to control the level of water in said water tank, a recirculation conduit from said third conduit to said solution tank, a three way valve connected to said third conduit and to said recirculation conduit, said valve normally closing said recirculation conduit and opening said third conduit to said gun, a shut-off valve in said air line, said shut-off valve normally being open, operating means connected to said three way valve and to said shut-off valve whereby to shut-off said air and simultaneously to direct said solution into said recirculation conduit, common means to actuate all four of said pumps simultaneously, means to deactuate the first three of said pumps while permitting said fourth pump to continue to operate, and additional control means for the pump deactuating means, said additional control means responding to the level of solution in said solution tank.

11. The system of claim 10 including a pressure regulator in said third conduit between said solution tank and said three-way valve, a fourth conduit connected to said third conduit and to said solution tank, said pressure regulator being between said three-way valve and the juncture of said third and fourth conduits, and a pressure relief valve in said fourth conduit, said pressure relief valve being set at a higher figure in pounds per square inch than said pressure regulator.

12. In a system for generating a stable foam from a liquid foam concentrate for use in lightweight concrete materials, an apparatus consisting of two pumps, means to maintain a substantially constant inlet liquid pressure and a substantially constant outlet liquid pressure respectively at and by these pumps to insure accuracy of fluid metering, one pump metering plain water, the other pump metering liquid concentrate, said two pumps being linked together by driving means so that a constantly proportional speed is maintained between said two pumps, discharge lines for said pumps, blending means for said discharge lines, said blending means being arranged so that the respective liquids being metered are blended following metering, a third pump located to receive said blended liquid and impart a relatively constant pressure to said blended liquid on the discharge side of said third pump by means of bypassing a portion of said blended liquid through a pressure bypass valve, the remaining portion of said blended liquid being forced by said third pump through a relatively small aperture in an enclosure, and means for admitting compressed air into said enclosure on the discharge side of said aperture, whereby the compressed air is mixed with said blended liquid to generate a prefabricated foam.

13. In a system for generating a stable foam from a liquid foam concentrate for use in light weight concrete materials, an apparatus consisting of two pumps, means to maintain a substantially constant inlet liquid pressure and a substantially constant outlet liquid pressure respectively at and by these pumps to insure accuracy of fluid metering, one pump metering plain water, the other pump metering liquid concentrate, said two pumps being linked together by driving means so that a constant proportional speed is maintained between said two pumps, discharge lines for said pumps, blending means for said discharge lines, said blending means being arranged so that the respective liquids being metered are blended following metering, a third pump located to receive said blended liquid and impart a relatively constant pressure to said blended liquid on the discharge side of said third pump by means of by-passing a portion of said blended liquid through a pressure by-pass valve, the remaining portion of said blended liquid being forced by said third pump through a relatively small aperture in an enclosure, means for admitting compressed air into said enclosure on the discharge side of said aperture, whereby the compressed air is mixed with said blended liquid to generate a prefabricated foam, the means to maintain a constant inlet pressure for the pump which meters liquid concentrate comprising a reservoir for the liquid concentrate which feeds said concentrate by gravity to the inlet of the concentrate metering pump, the means for maintaining a constant inlet pressure for the pump which meters water comprising a reservoir for water which feeds said water by gravity to the inlet of the water metering pump, means to maintain a relatively constant liquid level in said reservoirs, a reservoir for blended foam concentrate and water which reservoir feeds said blended foam concentrate and water by gravity to the inlet of said third pump, and means for actuating the concentrate metering pump and the water metering pump so that blended foam concentrate and water is delivered to the reservoir for said blended foam concentrate and water in substantially the same quantity it is being withdrawn from said last mentioned reservoir by said third pump.

14. The apparatus of claim 13 including a fourth pump synchronized with the concentrate metering pump and the water metering pump, which fourth pump withdraws foam liquid concentrate from a source and pumps said concentrate into the concentrate reservoir, said fourth pump delivering concentrate to the concentrate reservoir in excess of that being metered from the concentrate reservoir, the excess of concentrate delivered to the concentrate reservoir returning through an overflow aperture and thence by conduit to said concentrate source, thereby maintaining a substantially constant level in said concentrate reservoir.

15. Apparatus for producing air generated foam which comprises a blender; a first pump for pumping liquid foam concentrate to said blender; a second pump for pumping water to said blender, whereby to form a solution of liquid foam concentrate and water; means to maintain a constant head of liquid foam concentrate on the inlet side of said first pump, whereby said first pump meters said liquid foam concentrate as it pumps it; means to maintain a substantially constant head of water on the inlet side of said second pump, whereby said second pump meters said water as it pumps it; means to maintain a constant proportional speed between said first and said second pumps; foaming means comprising a housing, means including a relatively small aperture through which the solution of liquid foam concentrate and water passes into said housing, and means to introduce compressed air into said housing; a third pump to receive the solution of liquid foam concentrate and water from said blender and force it through said relatively small aperture; means between said third pump and said aperture to maintain a constant pressure on the solution of liquid foam concentrate and water moved by said third pump; and means to actuate all of said pumps.

16. Apparatus for producing air generated foam which comprises a blender; a first pump for pumping liquid foam concentrate to said blender; a second pump for pumping water to said blender, whereby to form a solution of liquid foam concentrate and water; means to maintain a constant head of liquid foam concentrate on the inlet side of said first pump, whereby said first pump meters said liquid foam concentrate as it pumps it; means to maintain a substantially constant head of water on the inlet side of said second pump, whereby said second pump meters said water as it pumps it; means to maintain a constant proportional speed between said first and said second pumps; foaming means comprising a housing, means including a relatively small aperture through which the solution of liquid foam concentrate and water passes into said housing, and means to introduce compressed air into said housing; a third pump to receive the solution of liquid foam concentrate and water from said blender and force it through said relatively small aptreure; means between said third pump and said aperture to maintain a constant pressure on the solution of liquid foam concentrate and water moved by said third pump; means to actuate all of said pumps; a reservoir located between said blender and said third pump so as to receive the solution of liquid foam concentrate and water being discharged from said blender under the influence of said first and second pumps; the means to maintain a constant pressure on the solution moved by said third pump comprising a pressure regulator valve located between said third pump and said aperture, and a by-pass valve located between said regulator valve and said third pump and discharging to said reservoir, said by-pass valve having a higher setting in pounds per square inch than said regulator valve.

17. The apparatus of claim 16 in which the means to maintain a constant head of liquid foam concentrate against said first pump comprises a reservoir for said liquid foam concentrate, said first pump pumping liquid foam concentrate from said reservoir to said blender, another pump for pumping liquid foam concentrate from a source to said last mentioned reservoir, said last mentioned pump moving a greater quantity of concentrate than said first pump, and overflow means from said last mentioned reservoir to said source of liquid foam concentrate, whereby also to stir the liquid foam concentrate at said source.

18. The apparatus of claim 17 in which the means to actuate all of said pumps comprises a drive connection successively between said third pump, said second pump, said first pump and said last mentioned pump; clutch means to break the drive connection between said third pump and said second pump whereby to deactuate said second pump, said first pump and said last mentioned pump while said third pump remains actuated; and actuating means for said clutch means, said actuating means being responsive to the level of solution in said first mentioned reservoir, said third pump normally moving less solution from said first mentioned reservoir than is being received by said first mentioned reservoir from said blender.

References Cited in the file of this patent

UNITED STATES PATENTS

| | | |
|---|---|---|
| 1,902,046 | Raines | Mar. 21, 1933 |
| 2,106,043 | Urguhart et al. | Jan. 18, 1938 |
| 2,692,798 | Hicks | Oct. 26, 1954 |
| 2,739,608 | Brower | Mar. 27, 1956 |
| 2,822,112 | Bremer | Feb. 4, 1958 |
| 2,833,374 | Glasser | May 6, 1958 |
| 2,859,759 | Hurwitz | Nov. 11, 1958 |